H. A. HOKE.
BRAKE HANGER.
APPLICATION FILED NOV. 4, 1915.
1,166,521.
Patented Jan. 4, 1916.
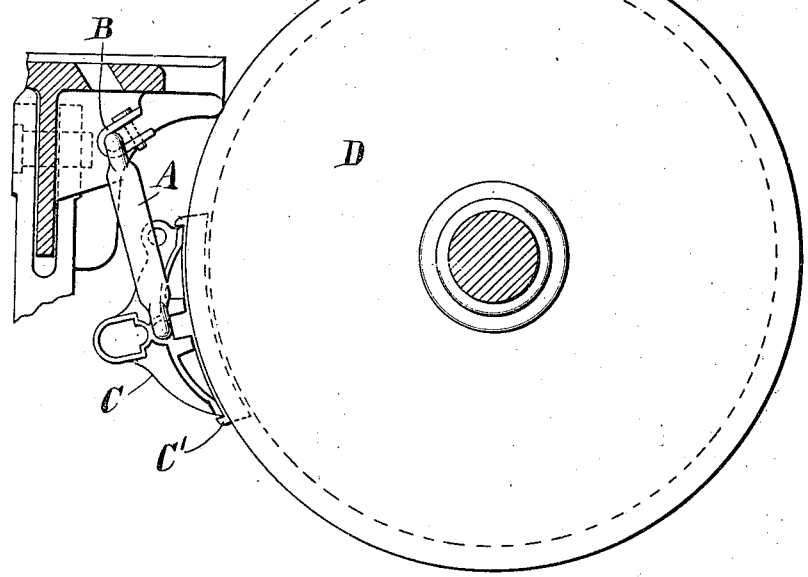
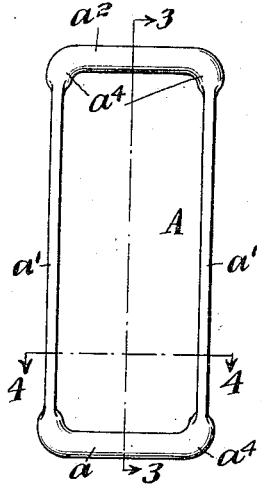
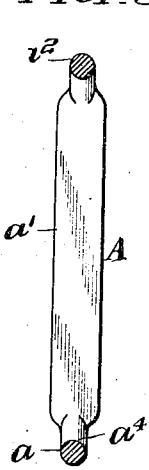
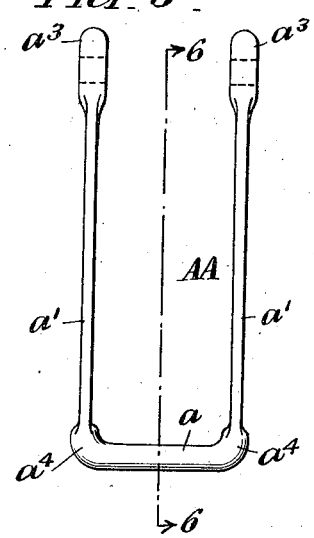
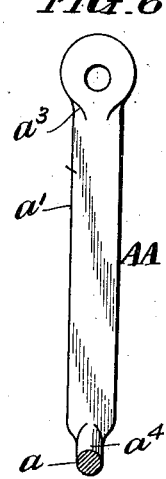
Witness
Daniel Webster Jr.
Inventor
Harry A. Hoke
By Francis T. Chambers
Attorney

UNITED STATES PATENT OFFICE.

HARRY A. HOKE, OF ALTOONA, PENNSYLVANIA.

BRAKE-HANGER.

1,166,521.
Specification of Letters Patent.
Patented Jan. 4, 1916.

Application filed November 4, 1915. Serial No. 59,505.

*To all whom it may concern:*

Be it known that I, HARRY A. HOKE, a citizen of the United States of America, residing in Altoona, in the county of Blair and State of Pennsylvania, have invented certain new and useful Improvements in Brake-Hangers, of which the following is a true and exact description, reference being had to the accompanying drawings, which form a part thereof.

My present invention consists in an improved form of brake hanger for use in supporting the brake beam of a railway car or tender truck and the object of my invention is to provide an integral brake hanger of either the closed link or the U-shape type which is of varying rigidity in different portions so that certain less rigid portions of the hanger may readily bend instead of disruptively opposing certain forces to which they may be subjected in the practical use of the hanger, while the remainder of the hanger possesses a desirable stiffness needed therein.

In carrying out my invention I form different portions of the hanger of varying cross section, flattening the portions which I desire to be yieldable thus avoiding a reduction in cross section of these parts below that necessary to insure their desired strength. By proceeding in this manner I am enabled to produce a compact hanger, which is comparatively inexpensive to manufacture and possesses practically maximum strength for the quantity of material employed therein.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described embodiments of my invention.

Of the drawings: Figure 1 is a somewhat diagrammatic elevation of a portion of a truck in which my improved brake hanger is employed; Fig. 2 is an elevation of the brake hanger employed in Fig. 1; Fig. 3 is a section on the line 3—3 of Fig. 2; Fig. 4 is a section on the line 4—4 of Fig. 2; Fig. 5 is an elevation of a modified form of brake hanger; and Fig. 6 is a section on the line 6—6 of Fig. 5.

In the typical truck construction shown diagrammatically in Fig. 1 to illustrate the use of my improved brake hanger, A represents the brake hanger; B the brake hanger carrier by which the upper end of the brake hanger is pivotally connected to the truck frame; and C the brake head to which the lower end of the brake hanger A is pivotally connected. D represents the wheel engaged in the braking operation by the brake shoe C' secured to the brake head C. The lower end portion $a$ of the hanger A is cylindrical, and adapted to be journaled in the usual socket with which the coöperating brake head is provided for this purpose. The upper portion $a^2$ is also cylindrical and adapted to be journaled in the brake hanger carrier B. The side portions $a'$ of the brake hanger are flattened to make their thickness, measured parallel to the length of the brake beam, substantially less than their breadth, measured transversely of the length of the brake beam. Advantageously as shown, the flattening of the side portions $a'$ does not extend into the bends $a^4$ connecting the side portions to the cylindrical top and bottom portions $a$ and $a^2$ respectively. In forming the hanger shown out of bar stock, the link closing weld joint may advantageously be made in the top portion $a^2$.

On account of the wear on the wheel hubs, boxes, bearings, etc., there is eventually considerable lateral movement of the brake beam in the direction of the length of the beam relative to the support for the upper end of the brake beam hanger. With a hanger formed in accordance with the present invention the flattened side portions $a'$ are adapted to bend readily under, instead of disruptively opposing the force tending to give the suspended brake beam its lateral movement relative to the truck from which the beam is suspended. At the same time the carrier is of ample strength to resist the tension and compression loads to which it is subjected when the brakes are applied. On any brake application the load on any hanger will be either a tension load or a compression load depending on the direction of rotation of the corresponding wheel D at that time. With the construction described, the hanger is given practically maximum strength for the amount of material used, coupled with a desirable flexibility and compactness which is highly desirable because of the restricted space in which a brake hanger is ordinarily mounted.

It will be obvious, of course, that the characteristic advantages of the closed link type hanger shown in Figs. 1 to 4 inclusive, may be obtained with a U shaped hanger such as the hanger AA shown in Figs. 5 and 6. The hanger AA differs from the hanger already described only in the omission of the upper portion $a^2$, and in the provision in lieu thereof of heavy ears $a^3$ at the upper ends of the side portions $a'$, these ears being apertured to receive the pin or bolt by which this type of carrier is pivotally connected to the truck frame.

Having now described my invention, what I claim as new and desire to secure by Letters Patent, is:

1. A railway brake hanger comprising depending side portions and an integral portion connecting one end of each side portion to the corresponding end of the other side portion and having said side portions more flexible than said connecting portion to permit said side portions to bend readily in a direction transverse to their length and parallel to their common plane.

2. A railway brake hanger comprising depending side portions and an integral portion connecting one end of each side portion to the corresponding end of the other side portion and having said side portions flattened to make them flexible in a direction transverse to their length and parallel to their common plane.

3. A brake hanger comprising a stiff brake head engaging portion and integral side portions flattened between their ends to make them flexible in a direction transverse to their length and parallel to the plane of the link.

4. A railway brake hanger of the integral link type having rigid end and corner portions and side portions flexible in a direction transverse to their length and parallel to the plane of the link.

5. A railway brake hanger of the integral link type having side portions flattened to make them flexible in a direction transverse to their length and parallel to the plane of the link.

6. A railway brake hanger of the integral link type comprising cylindrical end portions and connecting side portions flattened between their ends to make them flexible in a direction transverse to their length and parallel to the plane of the link.

HARRY A. HOKE.

Witnesses:
J. L. WERTZBERGER,
JAMES T. HANLON.